March 18, 1930. J. W. CHRISTIE 1,751,394
DRIVE FOR MOTOR VEHICLES
Filed Feb. 23, 1929 2 Sheets-Sheet 2
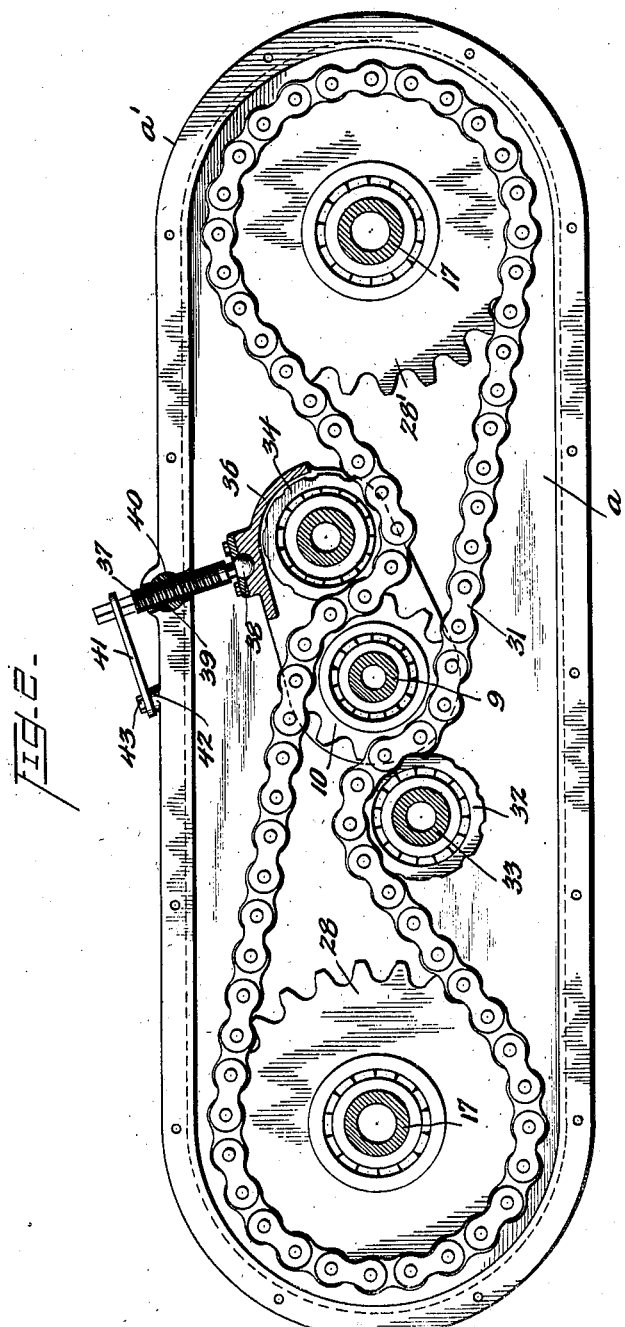
Inventor
John Walter Christie
By Attorneys Patented Mar. 18, 1930

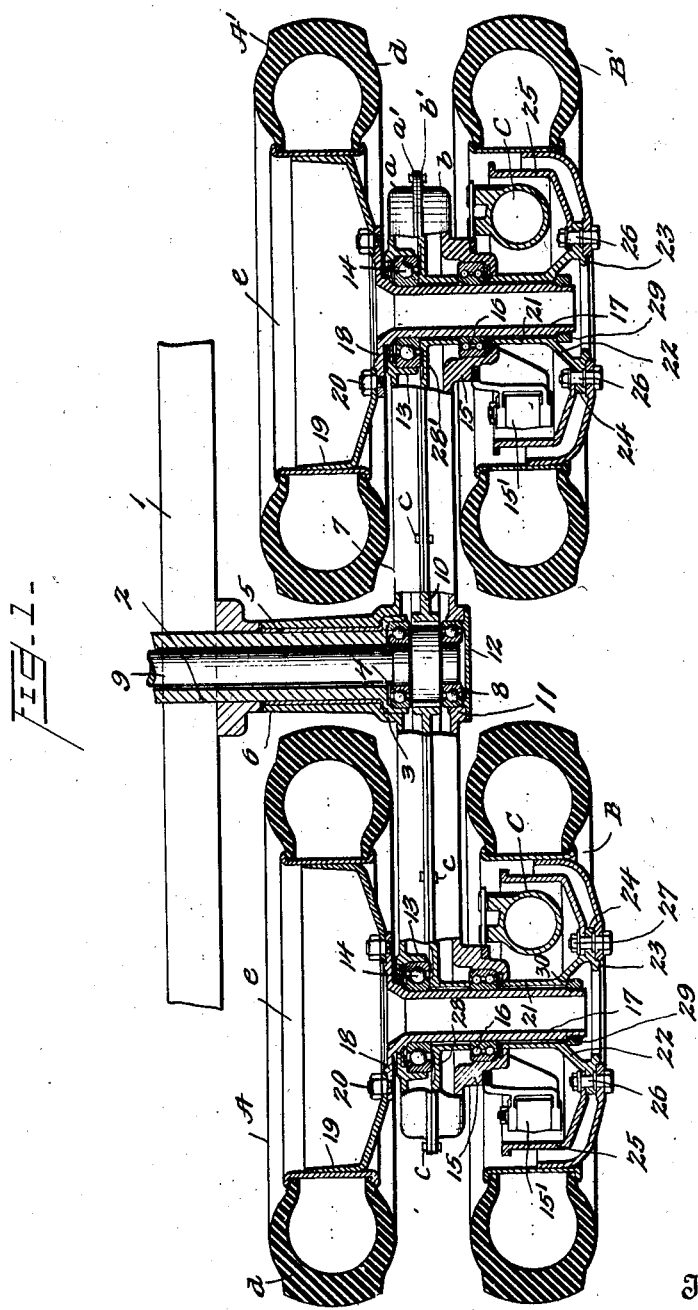

1,751,394

UNITED STATES PATENT OFFICE

JOHN WALTER CHRISTIE, OF AVON, NEW JERSEY, ASSIGNOR, BY MESNE ASSIGNMENTS, TO BROWNING CRANE COMPANY, OF CLEVELAND, OHIO, A CORPORATION OF OHIO

DRIVE FOR MOTOR VEHICLES

Application filed February 23, 1929. Serial No. 342,004.

Generically this invention relates to motor vehicles, but it more especially comprehends the heavy duty type embodying great traction area and improved balanced power distributor means for driving such vehicles.

An important object of this invention is the provision on each side of the vehicle of two pair of wheels constituting an eight-wheel unit and improved drive mechanism adapted to effect a balanced distribution of power to the unit under heavy load stresses and irrespective of uneven road surface conditions.

Another important object of this invention is the provision of two pair of wheels constituting a four-wheel unit on opposite sides of the vehicle, means carried by each pair for exerting a braking effect thereon, and means for effecting simultaneous control of the several units, thereby exerting a greater contact area with the road surface especially essential in connection with pneumatic-tired busses where ability to come to a full stop under varying speed conditions is of paramount importance in the interest of human safety.

A still further object of this invention is the provision of an eight-wheel drive balanced distributor pivotally mounted comprising a novel chain drive mechanism located substantially central of each four-wheel unit.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a view in horizontal section through the four wheel unit on one side of the vehicle with parts broken away showing a portion of the main shaft and chassis frame in elevation; and Fig. 2 is a longitudinal vertical section through the distributor casings showing the drive chain in elevation.

The rapid increase in motor vehicular travel, especially between distant points, has, by virtue of the inherent deficiencies of motor vehicle construction heretofore in use, necessitated building of larger and more powerful motor vehicles, requiring changes especially with reference to chassis construction commensurate with operating requirements, including greater traction area, balanced power distribution, and more efficient and powerful braking mechanisms, which, practice has demonstrated, I have accomplished by providing four-wheel units on opposite sides of the chassis, mounted on anti-friction bearings on a common axle, the two outer wheels of each four-wheel section being equipped with brake-drum and air-brake mechanisms so constructed that braking effect will also be transmitted to the opposite wheel of the pair, all of said mechanisms being simultaneously controlled by the operator of the vehicle, and by virtue of the combined braking effect on the eight-wheel unit and increased road surface contact area, the vehicle may be expeditiously brought to a stop even under heavy load and unusual speed conditions. The eight-wheel drive balanced distributor comprising a driving mechanism located centrally of each four-wheel unit enables a more balanced power distribution, better traction, and more even distribution and absorption of load stresses than has been possible in construction heretofore in use.

In the illustrated embodiment characterizing this invention there is shown a portion of a chassis frame 1, and load-carrying axle 2, terminating in an enlarged portion, 3, in which is mounted an anti-friction bearing 4. Mounted on axle 2 is a tubular member 5, on which is mounted the tubular hub portion 6 of carrier 7 comprising sections $a$ and $b$ formed with flanges $a'$ and $b'$ respectively and secured together by bolts $c$, or in any suitable manner. Mounted within the axle 2, journalled in bearings 4 and extending through carrier 7 with its outer end journalled in anti-friction bearings 8, is main drive shaft 9 on which is splined intermediate the bearings 4 and 8, drive sprocket 10, for a purpose hereinafter more fully appearing. The carrier 7 is formed with a flange 11 surrounding the opening therein in alignment with shaft 9 on which is suitably secured closure 12. The carrier extends outwardly and oppositely at right angles to hub 6, and the section *a* is formed adjacent each end with an inwardly projecting flange 13 in which is adapted to be mounted anti-friction bearing 14, and section *b* in substantial alignment with flange 13 is formed with a downwardly and inwardly projecting flange 15 in which is adapted to seat anti-friction bearing 16.

Tubular axle member 17 formed with a lateral flange 18 is adapted to be journalled in bearings 14 and 16, said flange having mounted thereon wheel A, equipped with pneumatic tire *d* and detachable rim *e* of conventional design; disc portion 19 of said wheel being secured by a series of bolts 20 as will be well understood. A somewhat similar member 21 is adapted to telescopically embrace member 17, and is keyed thereto as shown in Fig. 1, its outer end extending outwardly in a flared portion 22 and terminating in flanges 23 and 24 respectively. Seated on the inner surface of flange 24 is brake-drum 25 secured thereto by bolts 26, and to the outer surface is mounted wheel B also secured by bolts 26 and nuts 27. The inner end of member 21 terminates in drive sprocket 28, or said sprocket may be detachably splined thereon if desired. The outer end of tubular member 17 is threaded to receive lock-nut 29 which is adapted to seat on member 21 as at 30, thereby locking the wheels A and B into a unitary structure. It will be seen that power transmitted to sprocket 28 will be equally distributed to wheels A and B as a unit, as will be hereinafter more fully set forth. Mounted within the drum 25 suitably secured to member 15 is an air-brake mechanism C, and associated expansible brake shoe mechanism 15', operation of which effects the braking action on the wheel unit A—B, and which may be of the Christensen or other suitable type.

The construction and arrangement of the wheel A'—B' being identical to that of A—B, further description of detailed construction and related parts is deemed unnecessary.

Coming now to the power distribution means, it may be observed that carrier 7 houses the power distributing means to each four-wheel unit comprising aligned sprockets 28 and 28' and intermediate drive sprocket 10 adapted to transmit power to said sprockets through the instrumentality of chain 31 adapted to travel thereover.

In order that the power may be properly distributed between the drive sprocket 10 and sprockets 28 and 28', an idler sprocket 32 is mounted on shaft 33 suitably mounted in sections *a* and *b* of carrier 7 eccentrically located with respect to sprocket 10 in a lower plane intermediate said sprocket and sprocket 28, and sprocket 34 is located in a similar alternate position above said chain and intermediate sprockets 10 and 28', mounted in casing 36 suitably mounted on shaft 9, and adjustable to take up slack in said chain by means of adjustable screw 37 having its lower extremity connected to said casing by ball and socket joint 38, said screw being adjustably threaded through ball 39 mounted in socket 40 in complemental sections *a* and *b* of carrier 7 and secured in adjusted position by lock member 41 hingedly connected to projection 42 formed on section *a*, by set screw 43.

By virtue of this construction power stresses are distributed between sprockets 32, 10 and 34, and through sprockets 28 and 28' irrespective of direction of travel of sprocket 10, and thereby effecting equalized power distribution between said interrelated components under varying conditions.

It will also be noted in this connection that sprocket 10 is centrally positioned and in longitudinal alignment with sprockets 28 and 28' and that an idler sprocket 33 is positioned below chain 31 and idler sprocket 34 above said chain in alignment with sprocket 10 in a diagonal plane with respect to the longitudinal plane of the axes of sprockets 28 and 28' which not only maintains the chain in proper relation with said driven sprockets 28 and 28' but maintains chain 31 in operative contact with drive sprocket 10, thereby effecting an equal distribution of the driving torque to said driven sprockets.

It will be noted that any one of the wheels A—A' and B—B' may be removed by simply removing the exterior nuts of bolts or fastening elements 20 and 26, respectively.

From the above it is apparent that I have designed an automobile chassis construction for heavy duty work, but especially adaptable for the passenger transportation and rapid delivery type of vehicles, where a balanced distribution of power to the traction units, increased traction area, and more efficient braking mechanisms have been combined to add to the comfort and safety of travel; and, in addition, so designed with respect to the structural arrangement of interrelated parts as to permit the expeditious removal and replacement of any one or all of the traction wheels and other component parts of the traction units, thereby increasing the advantages of such vehicle for rapid transit purposes and reducing upkeep cost without appreciable increase in the initial cost of manufacture.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, and without enumerating variations and equivalents, what I desire protected by Letters Patent is as set forth in the following claims:

1. A driving mechanism for motor vehicles embodying in combination a carrier casing mounted on opposite sides of the vehicle, a pair of driven shafts rotatably journaled in the opposite ends of the casing, each shaft comprising keyed telescopic sections, a wheel supporting member attached to the free extremity of each telescopic section, a driving means, and a common means interconnecting said driving means and rotatable shafts, whereby power is transmitted from the former to the latter.

2. A driving mechanism for motor vehicles embodying in combination a carrier casing mounted on opposite sides of the vehicle, a pair of driven shafts rotatably journaled in said casing, each shaft comprising keyed telescopic sections, a wheel supporting member detachably secured to the free extremity of each section, a driving means, and a common means interconnecting said driving means and rotatable shafts, whereby power is transmitted from the former to the latter.

3. A driving mechanism for motor vehicles embodying in combination a carrier casing mounted on opposite sides of the vehicle, a pair of driven shafts rotatably journaled in the opposite ends of the casing, each shaft comprising telescopic sections, means for locking said sections together, a wheel supporting member detachably secured to the free extremity of each section, a driving means, and a common driven means interconnecting said driving means and rotatable shafts central of the latter, whereby an equal distribution of power is transmitted from said driving means to said shafts.

4. A driving mechanism for motor vehicles comprising a driving unit composed of a pair of spaced road wheels, a sectional axle common to both wheels, means for interlocking said sections, the free extremity of one section terminating in a wheel attaching flange, the free extremity of the other section terminating in a brake drum flange, said brake drum flange also constituting a wheel attaching flange, and means for effecting detachable connection between the wheels and respective flanges without disturbing said brake drum.

5. A driving mechanism for motor vehicles embodying in combination a carrier casing pivotally mounted on opposite sides of the vehicle, a driven shaft rotatably journaled in the opposite ends of the casing, a wheel detachably secured to the free extremity of each shaft, a driving means within the casing intermediate said shafts, a common sprocket chain interconnecting said driving means and rotatable shafts, an idler sprocket positioned above and below the chain on opposite sides of the driving means, the axis of said idler sprockets and driving means being in a diagonal plane with respect to the longitudinal plane of the axis of said shafts, whereby the chain is maintained in contact with opposite sides of the driving means and an equal distribution of the driving torque to said shafts is effected irrespective of direction of travel of the vehicle.

6. A driving mechanism for motor vehicles embracing in combination a support on opposite sides of the vehicle, a pair of driven shafts journaled in said support, each shaft comprising telescopic sections, means for locking said sections together, a wheel detachably secured to the free extremity of each section, a driving means, and means interconnecting said driving means and driven shafts, whereby power is transmitted from the former to the latter.

7. A driving mechanism for motor vehicles comprising pairs of wheels on each side of the vehicle, a sectional shaft for each pair, means for locking the sections together, a wheel detachably secured to the free extremity of each section, a drive shaft common to said pairs and about which axis they are adapted to oscillate, means for driving said pairs arranged symmetrically about said axis intermediate said wheels and interconnecting said pairs and drive shaft, and means for driving said shaft.

8. A driving mechanism for motor vehicles comprising pairs of wheels on each side of the vehicle, a shaft for each pair comprising telescopic sections, means for locking the sections together, the free extremity of each section terminating in a wheel attaching member, a drive shaft common to said pairs and about which axis they are adapted to oscillate, means for driving said pairs arranged symmetrically about said axis intermediate said wheels and interconnecting said pairs and drive shaft, and means for driving said shaft.

This specification signed this 5th day of February A. D. 1929.

JOHN WALTER CHRISTIE.